US012767770B2

(12) United States Patent
Bhadra et al.

(10) Patent No.: US 12,767,770 B2
(45) Date of Patent: Oct. 20, 2026

(54) RUBBER MASTERBATCH PREPARATION

(71) Applicant: CEAT LIMITED, Maharashtra (IN)

(72) Inventors: Sambhu Bhadra, Vasna Vadodara (IN); Sujith Sasidharan Nair, Sama Vadodara (IN); Vivek Purohit, Vemali Vadodara (IN); Tuhin Saha, Vadodara (IN)

(73) Assignee: CEAT LIMITED, Mumbai Maharashtra (IN)

( * ) Notice: Subject to any disclaimer, the term of this patent is extended or adjusted under 35 U.S.C. 154(b) by 1003 days.

(21) Appl. No.: 17/767,386

(22) PCT Filed: Oct. 7, 2020

(86) PCT No.: PCT/IN2020/050860
§ 371 (c)(1),
(2) Date: Apr. 7, 2022

(87) PCT Pub. No.: WO2021/070196
PCT Pub. Date: Apr. 15, 2021

(65) Prior Publication Data
US 2024/0076456 A1 Mar. 7, 2024

(30) Foreign Application Priority Data
Oct. 7, 2019 (IN) ............................. 201921040613

(51) Int. Cl.
*C08J 3/21* (2006.01)

(52) U.S. Cl.
CPC ........... *C08J 3/212* (2013.01); *C08J 2307/02* (2013.01)

(58) Field of Classification Search
CPC .... C08J 3/212; C08J 2307/02; C08J 2300/26; C08J 3/226; B29C 48/022; B29C 48/92; B29C 2948/9259; B29C 2948/92704; B29C 48/405
See application file for complete search history.

(56) References Cited

U.S. PATENT DOCUMENTS 6,800,126 B2 10/2004 Magnus et al.
6,841,606 B2 1/2005 Yanagisawa et al.
2010/0184893 A1 7/2010 Ignatz-Hoover
2011/0021664 A1 1/2011 Wang et al.
2015/0133592 A1* 5/2015 Miyasaka ................ C08J 3/226 524/495
2015/0247011 A1 9/2015 Nomura et al.

FOREIGN PATENT DOCUMENTS

CN 204 209 853 U 3/2015
JP S6054974 B2 12/1985
JP 2006152117 A 6/2006
JP 2006265311 A 10/2006
JP 2010235642 A 10/2010

OTHER PUBLICATIONS

International Search Report and Written Opinion, mailed Nov. 11, 2020, for International Application No. PCT/IN2020/050860, 8 pages.
Tan et al., "Rubber/clay nanocomposites by combined latex compounding and melt mixing: A masterbatch process," *Materials and Design* 34:825-831, Feb. 2012 [Published online Jul. 14, 2011]. (7 pages).
Yin et al., "Preparation and Properties of Silica/Styrene Butadiene Rubber Masterbatches by Latex Co-Coagulating Technology," *Polymer Composites*: 1212-1219, 2014.

* cited by examiner

*Primary Examiner* — Angela C Scott

(74) *Attorney, Agent, or Firm* — Seed Intellectual Property Law Group LLP

(57) ABSTRACT

The present disclosure relates to a process of preparing an elastomer composite in an extruder, said process comprising: (a) providing at least one solid particulate ingredient in a first mixing zone to obtain a first mix; (b) providing at least one elastomer in a second mixing zone to obtain a second mix; (c) contacting the first mix and the second mix to obtain a third mix; and (d) processing the third mix to obtain an elastomer composite, wherein the first mixing zone and the second mixing zone has a temperature in the range of 30° C.-50° C., the processing of the third mix is carried out at a temperature in the range of 100° C.-250° C. The present disclosure also relates to a formulation comprising an elastomer composite produced by the process as disclosed herein.

3 Claims, 1 Drawing Sheet

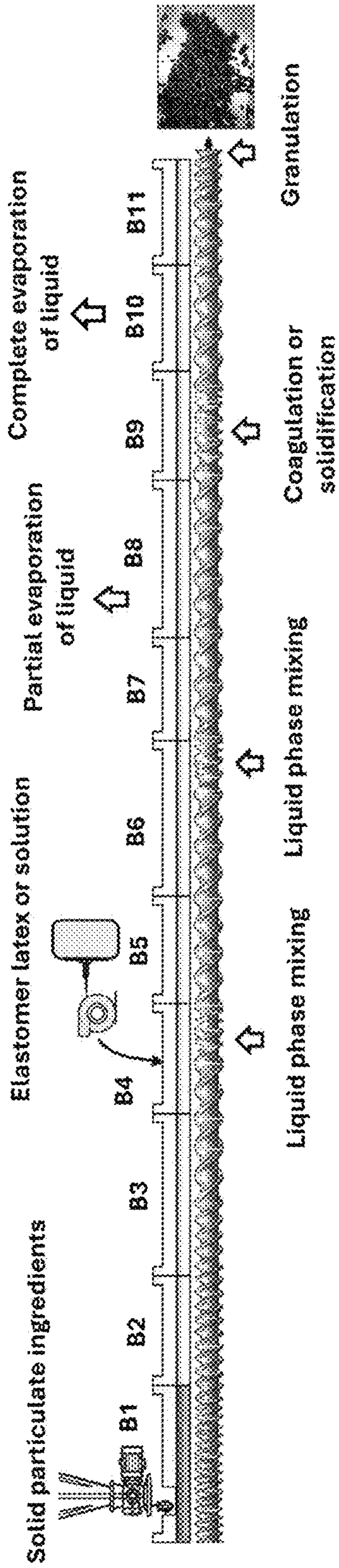
Solid particulate ingredients
Elastomer latex or solution
Partial evaporation of liquid
Complete evaporation of liquid
B1
B2
B3
B4
B5
B6
B7
B8
B9
B10
B11
Liquid phase mixing
Liquid phase mixing
Coagulation or solidification
Granulation

RUBBER MASTERBATCH PREPARATION

FIELD OF INVENTION

The present disclosure broadly relates to rubber masterbatches (MB) and particularly refers to a process of preparing an elastomer composite.

BACKGROUND OF INVENTION

The rubber composite or elastomer composite has various applications for the industrial use. Due to the fascinating properties of elastomers including flexibility, durability, and reliability, these elastomer composites are used for preparing a myriad of products, such as vehicle tires, sidewalls, wire skim, conveyor belts, wires, cables, and the like. An elastomer composite comprises various ingredients wherein each ingredient plays a specific role. The particulate filler such as carbon black is dispersed in a polymer selected from the group consisting of elastomers, natural rubber, or elastomer blends to obtain the elastomer composite. Additionally, other additives are also mixed along with the aforementioned ingredients for preparing the elastomer composite.

The mixing of rubber compounds is traditionally carried out in batch wise mixing equipment, such as roll mills or in internal mixers. As the rubbers are available as bales, the batch wise mixing equipment is used until today. Until the development of internal mixers, two roll mills were the major mixing equipment in the rubber industry for many years. Two roll mills are used exclusively in rubber compounding, especially for mastication as well as for mixing chemicals. The normal internal mixer is a discontinuous compounding machine which requires high mixing energy. The discontinuous mixing in internal mixer has some advantages, for example, high flexibility regarding different recipes and mixing orders. A major disadvantage of this process is that the batch mixing in internal mixer leads to differences in mixture quality from one batch to another.

Conventionally various methods that have been implemented to prepare elastomer composites using various mixing process to enable the dispersion of carbon black in the elastomer polymer. Different mixing techniques and apparatus employed for preparing elastomer composite are disclosed in the literature. For instance, U.S. Pat. No. 6,841,606B2 discloses a method for producing natural rubber master batch by mixing an elastomer latex in a carbon black slurry. In another method disclosed in JP2006152117A a masterbatch is prepared with diluted latex and carbon black slurry is dry mixed with transformer polybutadiene and N,N'-diphenylmethane bismaleimide to improve the balance between elasticity and increased heat buildup in tires produced from the rubber.

JP2006265311A discloses a pneumatic tire and method for producing a natural rubber master batch, wherein the filler dispersed in the aqueous slurry solution is mixed with the natural rubber latex to obtain the natural rubber master batch.

Good dispersion of particulate reinforcing agents in rubber compounds has been recognized for some time as one of the most important objectives for achieving good quality and consistent product performance. Considerable efforts have also been devoted to the development of methods to improve dispersion quality. Masterbatch and other mixing operations have a direct impact on the mixing efficiency and dispersion quality.

Current techniques that have been used in the literature involves a multi-step process for mixing the particulate filler and polymer to prepare the elastomer composite. Accordingly, there is a need to develop an improved process that incorporates carbon black in elastomer composites, so as to achieve an acceptable elastomer composite comprising carbon black as the sole or principal reinforcing agent by a simple process.

SUMMARY OF THE INVENTION

In a first aspect of the present disclosure, there is provided a process for preparing an elastomer composite in an extruder, said process comprising: (a) providing at least one solid particulate ingredient in a first mixing zone to obtain a first mix; (b) providing at least one elastomer in a second mixing zone to obtain a second mix; (c) contacting the first mix and the second mix to obtain a third mix; and (d) processing the third mix to obtain an elastomer composite, wherein the first mixing zone and the second mixing zone has a temperature in the range of 30° C.-50° C., the processing of the third mix is carried out at a temperature in the range of 100° C.-250° C.

In a second aspect of the present disclosure, there is provided a formulation comprising the elastomer composite prepared by the process comprising: (a) providing at least one solid particulate ingredient in a first mixing zone to obtain a first mix; (b) providing at least one elastomer in a second mixing zone to obtain a second mix; (c) contacting the first mix and the second mix to obtain a third mix; and (d) processing the third mix to obtain an elastomer composite, wherein the first mixing zone and the second mixing zone has a temperature in the range of 30° C.-50° C., the processing of the third mix is carried out at a temperature in the range of 100° C.-250° C., fillers, activators, accelerators, antioxidant, antiozonant, peptizer, processing aid, retarder, and combinations thereof.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter.

BRIEF DESCRIPTION OF ACCOMPANYING DRAWINGS

The following drawings form a part of the present specification and are included to further illustrate aspects of the present disclosure. The disclosure may be better understood by reference to the drawings in combination with the detailed description of the specific embodiments presented herein.

FIG. 1 illustrates the schematic diagram for the preparation of elastomer composites, in accordance with an implementation of the present disclosure.

DETAILED DESCRIPTION OF THE INVENTION

Those skilled in the art will be aware that the present disclosure is subject to variations and modifications other than those specifically described. It is to be understood that the present disclosure includes all such variations and modifications. The disclosure also includes all such steps, features, compositions, and compounds referred to or indicated in this specification, individually or collectively, and any and all combinations of any or more of such steps or features.

Definitions

For convenience, before further description of the present disclosure, certain terms employed in the specification, and examples are delineated here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only".

Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

For the purposes of the present disclosure, the term "filler" may be a carbon black. Selection of the filler or mixture of fillers will depend largely upon the intended use of the elastomer masterbatch product. As used here, filler can include any material which is appropriate for use in the masterbatch process. Conventional fillers such as silica, clay, calcium carbonate, talc and other functional equivalent thereof are within the scope of the fillers of the present disclosure.

The term "phr" used herein refers to parts per hundred rubber/resin. It is a unit well defined in the field of rubber technology to define the amount of ingredients used. The unit "phr" can also be interchangeably used with the unit "gram" as both denote phr/gram of ingredient per 100 phr/gram of rubber.

The term "rpm" used herein refers to rotations/revolutions per minute. It is a unit well used in the field of rubber technology to define the speed of any rotating part of the machine, in this disclosure especially for co-rotating twin screw extruder (CRTSE).

The term "at least one elastomer" used herein refers to an elastic polymer in the form of latex or dispersion or solution. Examples include, but are not limited to, natural rubber latex, RSS3, RSS4 and the like.

The term "natural rubber latex" used herein refers to an elastic substance obtained naturally from the latex (milky tree sap) derived from bark of trees.

The term "activator" used herein refers to the substances that have a strong activation effect of increasing the vulcanization speed in the cross-linking reaction of rubbers. Activators are required to achieve the desired vulcanization and end-user properties.

The term "accelerator" used herein refers to the substances used with a cross-linking agent to increase the speed of vulcanization of rubber and enhance its physical properties.

The term "antioxidant" used herein refers to the substances that are used to protect rubber articles against the attack of oxygen.

The term "antiozonant" used herein refers to the substances that prevent the degradation due to ozone cracking. Examples include ethylene di-urea, microcrystalline wax, and others.

The term "peptizer" used herein refers to the substances which break down polymer chains and reduce rubber viscosity during its processing.

The term "processing aid" used herein refers to the substances which helps in rubber processing. Examples include, but are not limited to, wood rosin.

The term "retarder" used herein refers to the substances added to rubber compounds to delay premature vulcanization during its processing. Examples include, but are not limited to, pre-vulcanization inhibitors (PVI), N-(cyclohexylthio) phthalimide (CTP).

The term "dry rubber content" used herein refers to the amount in grams of a rubber per 100 grams of the latex.

The term "fill factor" or "FF" used herein refers to the percentage fill in the mixing chamber of the Haake Rheomix OS mixer.

The term "ML (1+4) @ 100° C." (or Mooney Viscosity at 100° C.) used herein refers to conditions maintained while performing viscosity analysis on a sample of rubber or any other compound. It indicates the effect of temperature and time on the viscosity of rubber compounds. It is measured in terms of torque, required to rotate the disk embedded in the rubber/compound under specified conditions. Normally a pre-heat period is given to the elastomer following which the disc starts to rotate. The highest viscosity is recorded initially which later starts to decrease with time and reaches its lowest value. Viscosity measured with a large rotor is twice of that measured with a small rotor. Viscosity is measured in Mooney Units (MU) denoted herein by M. With reference to present disclosure, L refers to Large rotor, 1 refers preheat time in minutes, 4 refers to time in minutes after starting the rotor at which reading is taken, and 100° C. refers to the test temperature.

The term "moving die rheometer" or "MDR" used herein refers to rheological properties of rubber measured using a rheometer which is an instrument used to measure the viscoelastic properties of rubber during its curing process. A sample of rubber is placed inside a die cavity of the rheometer and a positive pressure is applied to it at a constant temperature. As the sample gets heated under pressure, its viscosity and torque vary with time which is recorded as ML and MH values. ML (moment lowest) is recorded at room temperature when the sample has minimum viscosity and torque. As further curing occurs, the torque exerted on the rotor increases and attains its maximum value denoted by MH (moment highest). All the measurements in the rheometric curve are recorded in terms of dN*m with varying time. With reference to the present disclosure, ts-30 min and ts-90 min refers to the time at which 30% of MH torque value and 90% of MH torque value has been achieved.

The term "modulus-300%" used herein refers to the force required for 300% elongation of a material. It is measured in units of pressure as MPa or kg/cm$^2$.

The term "tensile strength" used herein refers to the maximum load a material can withstand before fracture, breaking, tearing, etc. It is measured in the units of pressure as MPa or kg/cm$^2$.

The term "elongation at break %" used herein refers to the percentage change in elongation of a material at the instant of break.

The term "hardness shore A" used herein refers to the resistance of a material to indentation. It is measured using a device called shore durometer. There are several scales of a durometer out of which the two most common scales are A and D. Scale A is used for measuring the hardness of soft materials, such as polymers, elastomers and rubber.

The term "DMTA-ISO @ 70° C." used herein refers dynamic mechanical thermal analysis performed in accordance with the isothermal (ISO) method at 70° C. temperature. This is quality control method performed to evaluate the visco-elastic behavior of polymers composed of long chain molecules such as rubbers. In this method, a rubber sample is exposed to oscillating (sinusoidal) force (stress) and the resulting displacement (strain) is measured. E' denotes the storage modulus and measures the elastic portion. E" denotes the loss modules and measures the energy dissipated as heat. The ratio of E"/E' or "tan delta" denotes the loss or damping factor which measures the damping properties of the material.

The term "DIN abrasion" used herein refers to a quality control method performed to test the abrasion resistance of rubber in practical use. The testing is performed by moving a test piece of rubber across the surface of an abrasive sheet mounted on top of a revolving drum. This method is mainly used for rubber sample to be used for making tires and parts of tires, soles, conveyer/drive belts, hoses, and rubber floor coverings which undergo a lot of stress in actual service. The abrasion resistance is measured in terms of volume loss in $mm^3$ or abrasion resistance index in percentage, wherein a smaller abrasion resistance index indicates poor abrasion resistance.

The terms "composite" or "masterbatch" have been used interchangeably throughout the specification.

The term "first mix" used herein refers to particulate material which is a mixture obtained after extrusion of the at least one solid particulate ingredient in the first mixing zone.

Ratios, concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a temperature range of about 100° C.-250° C. should be interpreted to include not only the explicitly recited limits of about 100° C. to about 250° C., but also to include sub-ranges, such as 120° C., 140° C., 180° C., 200° C. and so forth, as well as individual amounts, including fractional amounts, within the specified ranges, such as 120.4° C., and 140.8° C., for example.

As discussed in the background section, presently the rubber (elastomer) composites are produced by the multiple batch process, wherein the fillers and other additives are premixed into an elastomer to make a concentrated batch and are then allowed to mix with the final rubber formulation in order to obtain the elastomer composite. Often, such batch processes are not able to achieve to complete dispersion of reinforcing agents which is highly essential for harsh wear conditions especially in heavy duty tires. In general, for instance when carbon black is employed to reinforce rubber, uniform dispersion of carbon black by dry-mix processes poses difficulties. More intensive mixing can improve carbon black dispersion, but also can degrade the elastomer into which the filler is being dispersed. This is problematic especially in the case of natural rubbers, which are highly susceptible to mechanical and thermal degradation. Also, when carbon black powder is mixed with rubber in a conventional apparatus, such as mixing mill, carbon particles comes out of the machine and get suspended in the surrounding air and floor. This makes the production floor dirty apart from contaminating the quality of air in the mixing premises which may in turn cause several occupational health hazards to the human resources working with the machines. With the advent of different machineries such as internal mixers, mills, batch in the market, elastomer composites have been obtained. However, there are few limitations associated with these machines and processes as well. The aforementioned machines generally involve multiple steps of mixing all the processing ingredients, wherein several factors including temperature and mixing speed at each step, order and timing of addition of each ingredient, and concentration of each component plays a critical role in bringing significant changes in the final quality of the rubber compound. As the rubber latex is processed in the form of bale or sheet through various steps in such machines, degradation of the polymer chains is another common setback. All existing methods mentioned in literatures start with the preparation of carbon black slurry. It is an additional step which needs separate apparatus and requires surfactant and water. Surfactants cannot be removed from the final product and removal of water also involves additional time and cost. In addition to above, the addition of acids at the final step of compounding often retards the curing rate of rubber compound that deteriorates the rubber properties and consequently reduces the lifetime of the rubber product produced therefrom. Overall, the elastomer composite produced by the batch process through multiple steps is time consuming and utilizes separate apparatus for each step of the process, i.e. preparing carbon black dispersion, mixing of rubber latex with carbon black dispersion, coagulating, drying, and granulating. Therefore, the production of elastomer composites by the conventional methods is quite expensive, labour intensive, and cumbersome.

To overcome the above described problems associated with the existing processes, the present disclosure relates to a simple, single step, and a continuous process for preparing an elastomer composite by using a single apparatus. In order to avoid the aforementioned problems associated with batch mixing processes such as by the Banbury mixer, the present disclosure utilizes a co-rotating twin screw extruder to carry out a continuous elastomer extrusion process.

In the present disclosure, the process of preparing an elastomer composite is disclosed, involving the steps: providing at least one solid particulate ingredient in a first mixing zone to obtain a first mix; (b) providing at least one elastomer in a second mixing zone to obtain a second mix; (c) contacting the first mix and the second mix to obtain a third mix; and (d) processing the third mix to obtain an elastomer composite. All the steps as mentioned above are carried out in a single CRTSE in a continuous mode and the temperature maintained in each of the mixing zones is less than 250° C. Moreover, the processing step involves sequential and continuous mixing, coagulation, drying and granulation of all the components which helps avoiding process interventions and makes the process smooth and cost-effective. The mixture containing elastomer and solid particulate ingredient is coagulated by employing a thermomechanical process, and thereby, overcomes the drawbacks associated with acids used for coagulation. The elastomer and solid particulate ingredients are contacted in a liquid phase that enables the elastomer (rubber) particles to efficiently adsorb the solid particulate ingredients on the surface enhancing their dispersion and distribution. Instead of using carbon black slurry, the process uses dry solid particulate ingredients directly in the powder or granular form, thereby eliminating the problems faced in handling carbon black slurry. The present disclosure provides a process highly effective in producing an elastomer composite having balanced machinal properties such as reinforcing ability, mooney viscosity, tear strength, and elongation limits. Thus, heavy load bearing rubber compounds produced therefrom, such as a truck tire tread potentially exhibits an improved capability to withstand high road abrasion and wear. Therefore, the process of obtaining the elastomer composite as disclosed in the present disclosure, is a simple, cost-effective, economical, and a time-efficient process that would open new opportunities in the realm of presently known processes for producing rubber masterbatches.

Unless defined otherwise, all technical and scientific terms used herein have the same meaning as commonly understood by one of ordinary skill in the art to which this disclosure belongs. Although any methods and materials similar or equivalent to those described herein can be used in the practice or testing of the disclosure, the preferred methods, and materials are now described. All publications mentioned herein are incorporated herein by reference.

The present disclosure is not to be limited in scope by the specific embodiments described herein, which are intended for the purposes of exemplification only. Functionally-equivalent products, compositions, and methods are clearly within the scope of the disclosure, as described herein.

In an embodiment of the present disclosure, there is provided a process for preparing an elastomer composite in an extruder, said process comprising: (a) providing at least one solid particulate ingredient in a first mixing zone to obtain a first mix; (b) providing at least one elastomer in a second mixing zone to obtain a second mix; (c) contacting the first mix and the second mix to obtain a third mix; and (d) processing the third mix to obtain an elastomer composite, wherein the first mixing zone and the second mixing zone has a temperature in the range of 30° C.-50° C., the processing of the third mix is carried out at a temperature in the range of 100° C.-250° C. In one another embodiment of the present disclosure, the first mixing zone and the second mixing zone has a temperature in the range of 32° C.-48° C., the processing of the third mix is carried out at a temperature in the range of 120° C.-200° C. In yet another embodiment of the present disclosure, the first mixing zone and the second mixing zone has a temperature in the range of 35° C.-45° C., the processing of the third mix is carried out at a temperature in the range of 140° C.-170° C.

In an embodiment of the present disclosure, there is provided a process for preparing an elastomer composite in an extruder, said process as described herein, wherein the first mix is particulate material.

In an embodiment of the present disclosure, there is provided a process for preparing an elastomer composite in an extruder, said process comprising: (a) providing at least one solid particulate ingredient in a first mixing zone to obtain a first mix; (b) providing at least one elastomer in a second mixing zone to obtain a second mix; (c) contacting the first mix and the second mix to obtain a third mix; and (d) processing the third mix to obtain an elastomer composite comprising: (1) coagulating the third mix to obtain a fourth mix; (2) drying the fourth mix to obtain a fifth mix; and (3) granulating the fifth mix to obtain the elastomer composite, wherein the first mixing zone and the second mixing zone has a temperature in the range of 30° C.-50° C., the processing of the third mix is carried out at a temperature in the range of 100° C.-250° C.

In an embodiment of the present disclosure, there is provided a process for preparing an elastomer composite in an extruder as described herein, wherein the process is carried out at a mixing speed in the range of 100-1200 rpm. In one another embodiment of the present disclosure, the process is carried out at a mixing speed in the range of 300-1100 rpm. In yet another embodiment of the present disclosure, the process is carried out at a mixing speed in the range of 450-1050 rpm.

In an embodiment of the present disclosure, there is provided a process for preparing an elastomer composite in an extruder, said process comprising: (a) providing at least one solid particulate ingredient selected from the group consisting of carbon black, silica, calcium carbonate, clay, and combination thereof in a first mixing zone to obtain a first mix; (b) providing at least one elastomer in a second mixing zone to obtain a second mix; (c) contacting the first mix and the second mix to obtain a third mix; and (d) processing the third mix to obtain an elastomer composite, wherein the first mixing zone and the second mixing zone has a temperature in the range of 30° C.-50° C., the processing of the third mix is carried out at a temperature in the range of 100° C.-250° C. In another embodiment of the present disclosure, the at least one solid particulate ingredient is carbon black.

In an embodiment of the present disclosure, there is provided a process for preparing an elastomer composite in an extruder, said process comprising: (a) providing at least one solid particulate ingredient in a first mixing zone to obtain a first mix; (b) providing at least one elastomer selected from the group consisting of natural rubber latex, styrene butadiene rubber latex, butadiene rubber latex, acrylonitrile butadiene rubber latex, chloroprene rubber latex, neoprene rubber latex, and combinations thereof in a second mixing zone to obtain a second mix; (c) contacting the first mix and the second mix to obtain a third mix; and (d) processing the third mix to obtain an elastomer composite, wherein the first mixing zone and the second mixing zone has a temperature in the range of 30° C.-50° C., the processing of the third mix is carried out at a temperature in the range of 100° C.-250° C. In another embodiment of the present disclosure, the at least one elastomer is natural rubber latex.

In an embodiment of the present disclosure, there is provided a process for preparing an elastomer composite in an extruder, said process comprising: (a) providing at least one solid particulate ingredient selected from the group consisting of carbon black, silica, calcium carbonate, clay, and combination thereof in a first mixing zone to obtain a first mix; (b) providing at least one elastomer selected from the group consisting of natural rubber latex, styrene butadiene rubber latex, butadiene rubber latex, acrylonitrile butadiene rubber latex, chloroprene rubber latex, neoprene rubber latex, and combinations thereof in a second mixing zone to obtain a second mix; (c) contacting the first mix and the second mix to obtain a third mix; and (d) processing the third mix to obtain an elastomer composite comprising: (1) coagulating the third mix to obtain a fourth mix; (2) drying the fourth mix to obtain a fifth mix; and (3) granulating the fifth mix to obtain the elastomer composite, wherein the first mixing zone and the second mixing zone has a temperature in the range of 30° C.-50° C., the processing of the third mix is carried out at a temperature in the range of 100° C.-250° C.

In an embodiment of the present disclosure, there is provided a process for preparing an elastomer composite in an extruder as described herein, wherein the at least one elastomer has a dry rubber content (DRC) in the range of 10-60% with respect to the at least one elastomer. In one another embodiment of the present disclosure, the at least one elastomer has a dry rubber content in the range of 30-60% with respect to the at least one elastomer. In yet one another embodiment of the present disclosure, the at least one elastomer is natural rubber latex having dry rubber content of 60% with respect to the at least one elastomer.

In an embodiment of the present disclosure, there is provided a process for preparing an elastomer composite in an extruder, said process comprising: (a) providing carbon black as the at least one solid particulate ingredient in a first mixing zone at a temperature of 40° C. to obtain a particulate material; (b) providing natural rubber latex as the at least one elastomer in a second mixing zone at a temperature of 50° C. to obtain a second mix; (c) contacting the first mix and the second mix to obtain a third mix; and (d) processing the third mix at a temperature of 150° C. and at a mixing speed of 500 rpm to obtain an elastomer composite comprising: (1) coagulating the third mix to obtain a fourth mix; (2) drying the fourth mix to obtain a fifth mix; and (3) granulating the fifth mix to obtain the elastomer composite.

In an embodiment of the present disclosure, there is provided a process for preparing an elastomer composite in an extruder, said process comprising: (a) providing carbon black as the at least one solid particulate ingredient in a first mixing zone at a temperature of 40° C. to obtain a particulate material; (b) providing natural rubber latex as the at least one elastomer in a second mixing zone at a temperature of 50° C. to obtain a second mix; (c) contacting the first mix and the second mix to obtain a third mix; and (d) processing the third mix at a temperature of 200° C. and at a mixing speed of 1000 rpm to obtain an elastomer composite comprising: (1) coagulating the third mix to obtain a fourth mix; (2) drying the fourth mix to obtain a fifth mix; and (3) granulating the fifth mix to obtain the elastomer composite. In an embodiment of the present disclosure, there is provided a process for preparing an elastomer composite in an extruder, said process as described herein, wherein the elastomer composite is natural rubber-carbon black master batch (NR-CB MB).

In an embodiment of the present disclosure, there is provided a formulation comprising the elastomer composite prepared by the process comprising (a) providing at least one solid particulate in a first mixing zone to obtain a first mix; (b) providing at least one elastomer in a second mixing zone to obtain a second mix; (c) contacting the first mix and the second mix to obtain a third mix; and (d) processing the third mix to obtain an elastomer composite, wherein the first mixing zone and the second mixing zone has a temperature in the range of 30° C.-50° C., the processing of the third mix is carried out at a temperature in the range of 100° C.-250° C., fillers, activators, accelerators, antioxidant, antiozonant, peptizer, processing aid, retarder, and combinations thereof.

In an embodiment of the present disclosure, there is provided a formulation comprising the elastomer composite prepared by the process as described herein, fillers, activators, accelerators, antioxidant, antiozonant, peptizer, processing aid, retarder, and combinations thereof, wherein the formulation is prepared in a banbury mixer or intermix or Haake Rheomix OS mixer.

In an embodiment of the present disclosure, there is provided a formulation comprising a combination of the elastomer composite comprising carbon black and natural rubber latex, zinc oxide as fillers, combination of stearic acid and sulfur as activators, N-cyclohexyl-2-benzothiazole sulfenamide (CBS) as accelerators, N-(1,3-dimethylbutyl)-N'-phenyl-p-phenylenediamine (6PPD) as antioxidant, wax as antiozonant, and wood rosin as processing aid.

In an embodiment of the present disclosure, there is provided a formulation comprising a combination of the elastomer composite comprising carbon black and natural rubber latex, zinc oxide as fillers, combination of stearic acid and sulfur as activators, N-cyclohexyl-2-benzothiazole sulfenamide (CBS) as accelerators, N-(1,3-dimethylbutyl)-N'-phenyl-p-phenylenediamine (6PPD) as antioxidant, wax as antiozonant, wood rosin as processing aid, and N-(cyclohexylthio) phthalimide (CTP) as retarder.

In an embodiment of the present disclosure, there is provided a process for preparing an elastomer composite in an extruder as described herein, wherein the process is carried out in co-rotating twin screw extruder (CRTSE).

In an embodiment of the present disclosure, there is provided a process for preparing an elastomer composite in an extruder as described herein, wherein the process is carried out in co-rotating twin screw extruder (CRTSE) at kneading block percentage in the range of 10-60%.

In an embodiment of the present disclosure, there is provided a process for preparing an elastomer composite in an extruder as described herein, wherein the at least one elastomer is in the form of latex or dispersion or solution.

In an embodiment of the present disclosure, there is provided a process for preparing an elastomer composite in an extruder as described herein, wherein the at least one solid particulate ingredient is in the form of powder or granules. In another embodiment of the present disclosure, the at least one solid particulate ingredient is carbon black in the form of powder.

Although the subject matter has been described in considerable detail with reference to certain examples and implementations thereof, other implementations are possible.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods and compositions, the exemplary methods, devices and materials are described herein. It is to be understood that this disclosure is not limited to particular methods, and experimental conditions described, as such methods and conditions may apply.

Abbreviations

MDR: Moving die rheometer

DMTA: Dynamic mechanical thermal analysis

MOD: Modulus

Materials and Methods

Moisture content was measured using moisture analyzer (MA). CRTSE, Alpha 25 was procured from Steer Eng., India. Haake Rheomix OS mixer was procured from Thermo Fischer Scientific. Moving Die Rheometer, MDR 3000, MonTech, and Mooney viscosity (ML 1+4) at 100° C. using Mooney Viscometer, VR-1132, Ueshima, Japan. Stress vs. strain and tear test was performed using Universal testing machine (UTM), Strograph A E, Toyoseiki. Hardness was measured using Durometer, MonTech. The tensile strength and elongation at break was measured in Zwick universal testing machine Z010 under DIN 53516 in S2 sample size cut from 2 mm sheets. The Shore A hardness was measured with respect to DIN 53516 with 6 mm vulcanized sheet under room temperature. The thickness of the sample 6 mm is made by cutting three 2 mm sheets.

Example 1

Preparation of Elastomer Composite

An elastomer composites comprising at least one elastomer, carbon black powder was prepared in a CRTSE. Table 1 shows the different temperatures maintained at different barrel in the CRTSE. The schematic diagram for the preparation of elastomer composite is illustrated in FIG. 1. Firstly, 44 phr of carbon black (N134) powder was incorporated in the CRTSE from the gravimetric feeder in barrel 1 (B1) and extruded up till barrel 3 at 40° C. temperature to obtain a particulate material (first mix). Next, natural rubber latex, having 60% dry rubber content and 40% water, was added in the extruder at barrel 4 (50° C., second mixing zone) using a liquid feeding pump and thus a second mix comprising both NR latex and carbon black (in liquid state) was formed. The second mix along with the first mix was extruded in barrel 5 to 6 (third mixing zone) maintained at temperature at 60° C. and 80° C. respectively to obtain a third mix. From barrel 7, the temperature was increased to 150° C. for partial evaporation of water from the third mix. The same temperature was maintained up till barrel 11. The mixing speed was kept at 500 rpm or 1000 rpm in the third mixing zone. After partial evaporation of water from barrel 8, the third mix started solidifying/coagulating in barrel 9. Complete evaporation happened at barrel 10 where a dried mixture was obtained. This dried mixture was further granulated in barrel 11 to achieve solid granules of NR-N134 composite which was obtained from the extruder exit.

TABLE 1

| — | 40° C. | 40° C. | 50° C. | 60° C. | 80° C. | 150° C. | 150° C. | 150° C. | 150° C. | 150° C. |
|---|---|---|---|---|---|---|---|---|---|---|
| B1 | B2 | B3 | B4 | B5 | B6 | B7 | B8 | B9 | B10 | B11 |

Using the process as described above, 4 samples of elastomer composites comprising the NR-N134 composite were prepared, wherein the temperature between barrel 7 to 11 and screw speed in the respective mixing zone were varied. The corresponding moisture content in each of the sample was measured to analyze the appropriate processing temperature and mixing speed to achieve minimum moisture in the resultant elastomer composite, particularly NR-N134 masterbatch (MB). The proportion of natural rubber and N134 was kept same in all the composites. Table 2 depicts the results obtained for moisture content in sample T-1, T-2, T-3, and T-4. Sample T-3 and T-4 cured at higher temperature i.e., 200° C. contains lower moisture content than T-1 and T-2 cured at 150° C. Further, it can be observed that at lower mixing speed of 500 rpm, the moisture content also decreases.

TABLE 2

| Sample No | Temperature B7-B11 (° C.) | Screw speed (rpm) | Moisture content* (%) |
|---|---|---|---|
| T-1 | 150 | 500 | 2.2 |
| T-2 | 150 | 1000 | 2.4 |
| T-3 | 200 | 500 | 1.4 |
| T-4 | 200 | 1000 | 1.6 |

Example 2

Preparation of Formulation Comprising the NR-N134 Composite

Contents of Table 3 depicts 4 truck tire tread formulations prepared by mixing the present NR-N134 composite with the other formulation ingredients (as per recipe shown in Table 3). The mixing was done in Haake Rheomix OS mixer. Each compound (TC-1, TC-2, TC-3, and TC-4) comprises the same NR-N134 composite having 44 phr carbon black with 100 phr RSS4 natural rubber. Fill factor (FF) was of 68%. The rotor speed was maintained at 40 rpm and dumped at 105° C. To prepare the standard or control truck tire tread formulation, mixing was done in three steps; (i) preparation of masterbatch with rubber and other ingredients, except curatives, (ii) repass, (ii) final mixing with curatives.

Further detailing of the process as follows:

Step 1: Preparation of masterbatch: At first, all rubbers/elastomers/NR-N134 MB were incorporated and mixed for 45 seconds at a speed of 60 rpm. Then half of all ingredients (except curative system—i.e. sulfur, accelerator) were incorporated and mixed again for 60 seconds at a speed of 60 rpm. After that, remaining half of the ingredients were incorporated and mixed again for 45 seconds at a speed of 60 rpm. Finally, the mixing was continued for 340 seconds. At this stage, the rpm was varied to maintain the temperature at 150° C.

Step 2: Repass: The masterbatch was kept overnight for relaxation. Next day, it was re-mixed for 210 seconds at 70 rpm.

Step 3: Final mixing with curatives: The masterbatch and curatives were incorporated and mixed for 200 seconds to obtain the vulcanization mix. At this stage, the temperature was maintained below 100° C. by controlling the mixing speed.

TABLE 3

| Component | | Control | TC-1 | TC-2 | TC-3 | TC-4 |
|---|---|---|---|---|---|---|
| Natural rubber (NR) | RSS4 | 100.00 | — | — | — | — |
| Carbon black powder | N134 | 44.00 | — | — | — | — |
| NR-N134 | | — | 144.00 | 144.00 | 144.00 | 144.00 |
| Filler | Zinc oxide | 3.50 | 3.50 | 3.50 | 3.50 | 3.50 |
| Activator | Stearic acid | 2.00 | 2.00 | 2.00 | 2.00 | 2.00 |
| | Sulfur | 2.25 | 2.25 | 2.25 | 2.25 | 2.25 |
| Anti-oxidant | 6PPD | 2.70 | 2.70 | 2.70 | 2.70 | 2.70 |

TABLE 3-continued

| Component | | Control | TC-1 | TC-2 | TC-3 | TC-4 |
|---|---|---|---|---|---|---|
| Antiozonant | Wax | 1.00 | 1.00 | 1.00 | 1.00 | 1.00 |
| Processing aid | Wood rosin | 1.00 | 1.00 | 1.00 | 1.00 | 1.00 |
| Accelerator | CBS | 0.75 | 0.75 | 0.75 | 0.75 | 0.75 |

*Moisture content was measured at 125° C. for 10 minutes

The tread samples TC-1, TC-2, TC-3, and TC-4 comprising the NR-N134 composite were investigated for their mechanical properties using the rheometric test at 140° C. and Mooney viscosity (ML 1+4) at 100° C. The tensile, hardness and tear testing samples were cured at 148° C. for 30 minutes. For tensile strength and hardness shore A, five measurements were taken for each sample and the average was taken as the final value. The results of the rheometric test are recorded in Table 4.

TABLE 4

| Properties | Control | TC-1 | TC-2 | TC-3 | TC-4 |
|---|---|---|---|---|---|
| Mooney viscosity (ML1 + 4) @100° C. | 87 | 96.4 | 115.8 | 95.7 | 105.9 |
| Modulus 100% (kg/cm$^2$) | 28.2 | 26.6 | 29.3 | 25.3 | 24.9 |
| Modulus 200% (kg/cm$^2$) | 78.3 | 68.3 | 79.9 | 70.3 | 67.5 |
| Modulus 300% (kg/cm$^2$) | 152 | 136 | 158 | 142 | 139 |
| Modulus 400% (kg/cm$^2$) | 232 | 214 | 241 | 221 | 220 |
| Tensile strength (kg/cm$^2$) | 309.9 | 275.6 | 277.3 | 282.4 | 303.7 |
| Elongation at break (%) | 500.4 | 477 | 445.8 | 477.6 | 494.9 |
| Hardness shore A | 69.1 | 67.8 | 69.8 | 66.7 | 66.0 |

Mooney viscosity of the formulations comprising natural rubber-N134 masterbatch composites produced at lower screw speed (T-1 and T-3) was lower than that of higher screw speed. So, based on Mooney viscosity requirement, production parameter of NR-N134 masterbatch can be optimized. Modulus, tensile strength, elongation at break and hardness shore A properties of all the compounds were comparable.

Another truck tire tread compound comprising NR-N115 masterbatch was prepared to test the compatibility of the present process with other carbon black grades. Control compounds with N134 and N115 carbon black were prepared for comparison purpose. Both NR-N134 MB and NR-N115 MB were prepared in accordance with the process of the present disclosure. Table 5 depicts the concentration in phr for each of the component present in the compound.

TABLE 5

| Component | | Control A with N134 (phr) | MB with N134 (phr) | Control B with N115 (phr) | MB with N115 (phr) |
|---|---|---|---|---|---|
| Natural rubber (NR) | RSS4 | 100 | — | 100 | — |
| Carbon black powder | N134 | 44 | — | — | — |
| Carbon black powder | N115 | | | 44 | — |
| NR Latex-carbon black masterbatch | | | 144 | — | 144 |
| Filler | ZnO | 3.50 | 3.50 | 3.50 | 3.50 |
| Activator | Stearic acid | 2.00 | 2.00 | 2.00 | 2.00 |
| | Sulfur | 2.00 | 2.00 | 2.00 | 2.00 |
| Antioxidant | 6PPD | 2.00 | 2.00 | 2.00 | 2.00 |
| Antiozonant | Micro crystalline wax | 1.00 | 1.00 | 1.00 | 1.00 |

TABLE 5-continued

| Component | | Control A with N134 (phr) | MB with N134 (phr) | Control B with N115 (phr) | MB with N115 (phr) |
|---|---|---|---|---|---|
| Processing aid | Wood rosin | 1.00 | 1.00 | 1.00 | 1.00 |
| Antioxidant | TMQ | 0.70 | 0.70 | 0.70 | 0.70 |
| Accelerator | CBS | 0.75 | 0.75 | 0.75 | 0.75 |
| Retarder | CTP | 0.25 | 0.25 | 0.25 | 0.25 |

The mechanical properties of the compounds were tested and the results for which are depicted in Table 6. It can be observed that all the properties of the compounds containing NR-N134 MB and NR-N115 MB are comparable with respect to their controlled compounds. Hence, it was clear that no significant deterioration occurred in the quality of the compounds on changing the carbon black grade.

TABLE 6

| Property | Control A with N134 | LMB with N134 | Control B with N115 | LMB with N115 |
|---|---|---|---|---|
| Specific gravity | 1.0962 | 1.1026 | 1.0968 | 1.1170 |
| ML (1 + 4) @100° C. | 61.3 | 63.7 | 57.5 | 93.0 |
| ML 5 UP Mins @ 125° C. | 22.9 | 26.6 | 20.9 | 22.6 |
| MDR @ 148° CX60' | | | | |
| ML (dN-m) | 2.44 | 1.87 | 2.26 | 2.5 |
| MHF/MHR/MH (dN-m) | 15.80 | 15.52 | 14.69 | 16.59 |
| MH-ML (dN-m) | 13.36 | 13.65 | 12.43 | 14.09 |
| FINAL S' (dN-m) | 13.91 | 13.20 | 13.27 | 14.48 |
| ts - 2 Mins | 4.38 | 4.18 | 4.14 | 3.76 |
| ts - 30 Mins | 5.03 | 5.00 | 4.79 | 4.6 |
| ts - 90 Mins | 10.92 | 10.80 | 11.49 | 10.65 |
| Stress-strain SC | | | | |
| 50% MOD kg/cm$^2$ | 12.63 | 12.84 | 12.07 | 14.89 |
| 100% MOD kg/cm$^2$ | 20.88 | 20.57 | 19.71 | 25.85 |
| 200% MOD kg/cm$^2$ | 54.51 | 52.68 | 49.80 | 70.15 |
| 300% MOD kg/cm$^2$ | 107.43 | 106.74 | 95.46 | 132.99 |
| 400% MOD kg/cm$^2$ | 168.73 | 169.75 | 150.14 | 200.51 |
| Tensile strength (kg/cm$^2$) | 294.93 | 298.80 | 279.58 | 287.00 |
| Elongation at break % | 601.4 | 601.0 | 614.2 | 533.9 |
| M300%/M50% | 8.51 | 8.31 | 7.91 | 8.93 |
| Tensile strength (SD) | 8.68 | 10.23 | 7.42 | 4.43 |
| Hardness Shore A | 66.7 | 66.4 | 62.9 | 66.7 |
| Angle tear strength (kg/cm) | 128.87 | 130.21 | 127.71 | 119.78 |
| Carbon black dispersion | | | | |
| X-Value | 7.65 | 4.56 | 7.85 | 6.20 |
| Y-Value | 9.61 | 8.51 | 9.47 | 9.04 |
| Z-Value | 88.22 | 79.41 | 90.04 | 83.88 |
| DMTA - ISO @ 70° | | | | |
| E' (Mpa) | 5.3880 | 5.7195 | 5.2765 | 5.9360 |
| E'' (Mpa) | 0.9001 | 1.0145 | 0.9603 | 1.0220 |
| Tan delta | 0.1671 | 0.1774 | 0.1819 | 0.1722 |
| E* (Mpa) | 5.4630 | 5.8085 | 5.3635 | 6.0235 |
| DIN Abrasion (DIN 53516) | | | | |
| Abrasion resistance index (%) | 124.76 | 121.45 | 110.71 | 124.10 |

Advantages of the Present Disclosure

The above-mentioned implementation examples as described on this subject matter and its equivalent thereof have many advantages, including those which are described.

The present disclosure discloses a continuous process for the preparation of an elastomer composite using one single equipment (co-rotating twin-screw extruder) for mixing, coagulating, drying, and granulating in a single step. All the extrusion processes in different zones of the CRTSE are carried out at lower temperatures below 250° C. which makes it a highly energy efficient process. The process provides an enhanced homogenous distribution of the solid particulate ingredients in the elastomer present in liquid phase to achieve elastomer composite with desired properties. The process allows direct incorporation of solid particulate ingredients and hence eliminates the additional step of adding carbon black slurry. This helps to keep the production floor of the elastomer composite in a clean state. The use of thermomechanical method facilitates proper curing of the elastomers and ensures long-lasting properties in the rubber compound produced therefrom. A truck tire tread formulation comprising the present elastomer composite exhibits desirable mechanical properties such as abrasion resistance, visco-elastic behavior and tensile strength. Hence, an elastomer composite prepared by the process as disclosed herein, can also be used for manufacturing several other rubber products including tires, hose, conveyor belt, boat, dock fenders, mats, hot water bags, O rings, rail pads, rubber rollers and the like. Overall, the present disclosure provides a simple, cost-effective and a time saving process for the continuous production of a high-quality elastomer composite.

Although the subject matter has been described in considerable detail with reference to certain embodiments thereof, other embodiments are possible. As such, the spirit and scope of the disclosure should not be limited to the description of the embodiments contained herein.

We claim:

1. A process for preparing an elastomer composite in an extruder, said process comprising:

(a) providing at least one dry solid particulate ingredient in powder or granular form, in a first mixing zone to obtain a first mix;

(b) providing at least one elastomer in a second mixing zone to obtain a second mix;

(c) contacting the first mix and the second mix to obtain a third mix; and (d) processing the third mix to obtain an elastomer composite, wherein the first mixing zone and the second mixing zone have a temperature in the range of 30° C.-50° C., the processing of the third mix is carried out at a temperature in the range of 120° C.-200° C. and a mixing speed in the range of 450-1050 rpm, wherein the at least one dry solid particulate ingredient is selected from the group consisting of carbon black, silica, calcium carbonate, clay, and combinations thereof, wherein the at least one elastomer is selected from the group consisting of natural rubber latex, styrene butadiene rubber latex, butadiene rubber latex, acrylonitrile butadiene rubber latex, chloroprene rubber latex, neoprene rubber latex, and combinations thereof, and wherein the process is carried out in a single co-rotating twin screw extruder (CRTSE).

2. The process as claimed in claim 1, wherein the processing of the third mix to obtain the elastomer composite comprises:

(a) coagulating the third mix to obtain a fourth mix;

(b) drying the fourth mix to obtain a fifth mix; and (c) granulating the fifth mix to obtain the elastomer composite.

3. The process as claimed in claim 1, wherein the at least one elastomer has a dry rubber content (DRC) in the range of 10-60% with respect to the at least one elastomer.

* * * * *